US006956795B2

(12) United States Patent
Schwartz

(10) Patent No.: US 6,956,795 B2
(45) Date of Patent: Oct. 18, 2005

(54) AUTOMOTIVE RADIO WITH LIVE REWIND ON PLURAL CHANNELS

(76) Inventor: Daniel Schwartz, 144-10 69th Ave., Flushing, NY (US) 11367

( * ) Notice: Subject to any disclaimer, the term of this patent is extended or adjusted under 35 U.S.C. 154(b) by 603 days.

(21) Appl. No.: 10/137,799

(22) Filed: May 2, 2002

(65) Prior Publication Data

US 2003/0206499 A1 Nov. 6, 2003

(51) Int. Cl.[7] ................................................ H04H 9/00
(52) U.S. Cl. .......................................................... 369/7
(58) Field of Search ............................. 369/6, 7, 2, 21, 369/22; 455/95, 99, 32.1, 33.1, 36.1, 344, 455/345; 360/7, 5

(56) References Cited

U.S. PATENT DOCUMENTS 4,268,724 A * 5/1981 Hubbard ........................ 369/7
6,163,508 A * 12/2000 Kim et al. ..................... 369/7
6,665,234 B2 * 12/2003 Goodman et al. ............. 369/7

FOREIGN PATENT DOCUMENTS

JP 02278566 A * 11/1990

* cited by examiner

*Primary Examiner*—Thang V. Tran
(74) *Attorney, Agent, or Firm*—Ostrolenk, Faber, Gerb & Soffen, LLP

(57) ABSTRACT

An automotive radio with live rewind on a plurality of channels is realized by providing a memory in which the preprogrammed channels identified by the radio buttons have their contents continuously stored in endless memories over an immediately preceding duration that can measure a time period on the order from two to fifteen minutes. Simply by actuating the rewind button on a radio or an accompanying tape player, the radio responds by playing the immediately preceding segment over the radio speaker, so that the driver can recapture the last few minutes of a segment of interest.

22 Claims, 5 Drawing Sheets

Circular Memory Buffer - 29

AUTOMOTIVE RADIO WITH LIVE REWIND ON PLURAL CHANNELS

BACKGROUND OF THE INVENTION

The present invention generally relates to radios and, more particularly, to automotive radios and other entertainment systems with a "rewind" capability on one or more channels that enables listeners to hear the last few minutes of one or more programs, in response to their pressing of a rewind button on the radio or entertainment system.

Most people who listen to a car radios, switch regularly between the program channels. Often, when they switch to one of the channels, they hear the last few moments of a segment that they would have liked to have heard from the beginning, except that now it is too late, because they have missed it.

Moreover, even while listening to a car radio broadcast, the minds and ears of drivers wander by not being fully attentive to the radio content, due to the higher priority of driving safety. As a result, it is not uncommon that while listening to the radio—while driving—drivers do not pay full attention to a segment that they would like to have carefully listened to. Again, by the time the driver becomes aware of that desire, it is too late.

A conventional art search has turned up U.S. Pat. Nos. 6,243,594; 6,163,508; 6,067,278; 5,671,195; 5,633,837; 5,345,430; 5,263,199; 4,713,801; and 4,430,676. The contents of these patents are incorporated by reference herein to provide support for the conventional circuitry that is already known from the prior art, which may support elements of the inventions described herein.

Among these documents, U.S. Pat. No. 5,345,430 is directed to a recording device and method for recovering a portion of a commercial radio or TV broadcast immediately after listening to it. The device consists of a short term memory media that is used to continuously record the last few minutes of the program being monitored. A control object module causes the material on the short term storage media to be transferred to a long-term storage media. U.S. Pat. No. 5,633,837 similarly describes an automobile recorder that allows a user to continuously record the contents of radio programs and then send it to a solid state memory and thereafter transfer selected portions to a cassette tape or recordable compact disc. These documents are believed to fail to describe a simple to use facility and method for instant replay of program content that does not compromise driving safety nor provide simultaneous, multichannel recording and play back capabilities.

SUMMARY OF THE INVENTION

The present invention comprises a radio system that overcomes the aforementioned drawbacks of prior art, automotive radios and entertainment systems.

Essentially, the present invention is a simple mechanism that permits a radio broadcast to be rewound, almost as if it was playing from a cassette tape player. In fact, the method of rewinding is preferably none other than a "rewind" button on the radio and/or the rewind button on a tape player that usually accompanies the radio.

The present invention seeks to enhance and improve on conventional technology by, among other things, providing an instant "rewind" functionality that provides instant replay of stored content, rather than storage of content on media for delayed listening and to provide such functionality in response to actuation by a simple mechanism, such as an already provided or specially provided rewind button that can be operated without distraction of the driver, and without the driver needing to operate an instrument panel in the manner which would divert the driver's eyes and interfere with driving.

The present invention also aims to provide an ability to artificially rewind and listen to any one of a plurality of radio channels that are being recorded simultaneously.

It is a further object of the invention to provide an automotive radio with instant rewind capability that is easy to implement and whose operation does not distract the driver.

It is yet another object of the invention to provide a rewind capability in radio or even video equipment for automotive use that is implementable as an "add on" system to conventional radios.

The foregoing and other objects of the invention are realized with a radio system for vehicles that include a conventional section with a receiver, e.g. an RF receiver for receiving and conditioning a radio signal containing a plurality of program channel contents. A primary tuner responds to the RF receiver and tunes the selected program channel contents which is then provided to a signal conditioner circuit that prepares the signal to be ultimately played over the radio speaker. As used herein, "receiver" is intended to be used in its broadest sense as the interface to the source of the radio signal. This "receiver" certainly includes conventional radio receivers that it is also used herein in a broad enough sense to include a receiver that operates using the INTERNET PROTOCOL (IP) and other new forms of receivers that are being developed.

In accordance with the invention, a memory simultaneously stores in digital format, an immediately preceding predetermined, time measured quantity of the program channel content that is currently being played over the speaker. A single replay button is so operable and constructed, that the actuation thereof is alone sufficient to immediately cause the program channel content that has been stored in the memory to be replayed to the listener over the speaker.

In accordance with another aspect of the invention, the aforementioned memory is effective for simultaneously storing in digital form or format, time measured quantities of a plurality of signal channels containing programmed channel contents. Each program channel content is stored in a corresponding one of a plurality of memory sections. The channel programs are selected on the basis of settings of the plurality of channel select buttons and each of the memory contents is selectable for being played over the speaker.

The program channel contents being stored can be programmed to be of a duration of thirty seconds, or several or more minutes. The preferable time period is from two to fifteen minutes.

Other features and advantages of the present invention will become apparent from the following description of the invention which refers to the accompanying drawings.

DETAILED DESCRIPTION OF THE DRAWINGS

Figure 1:
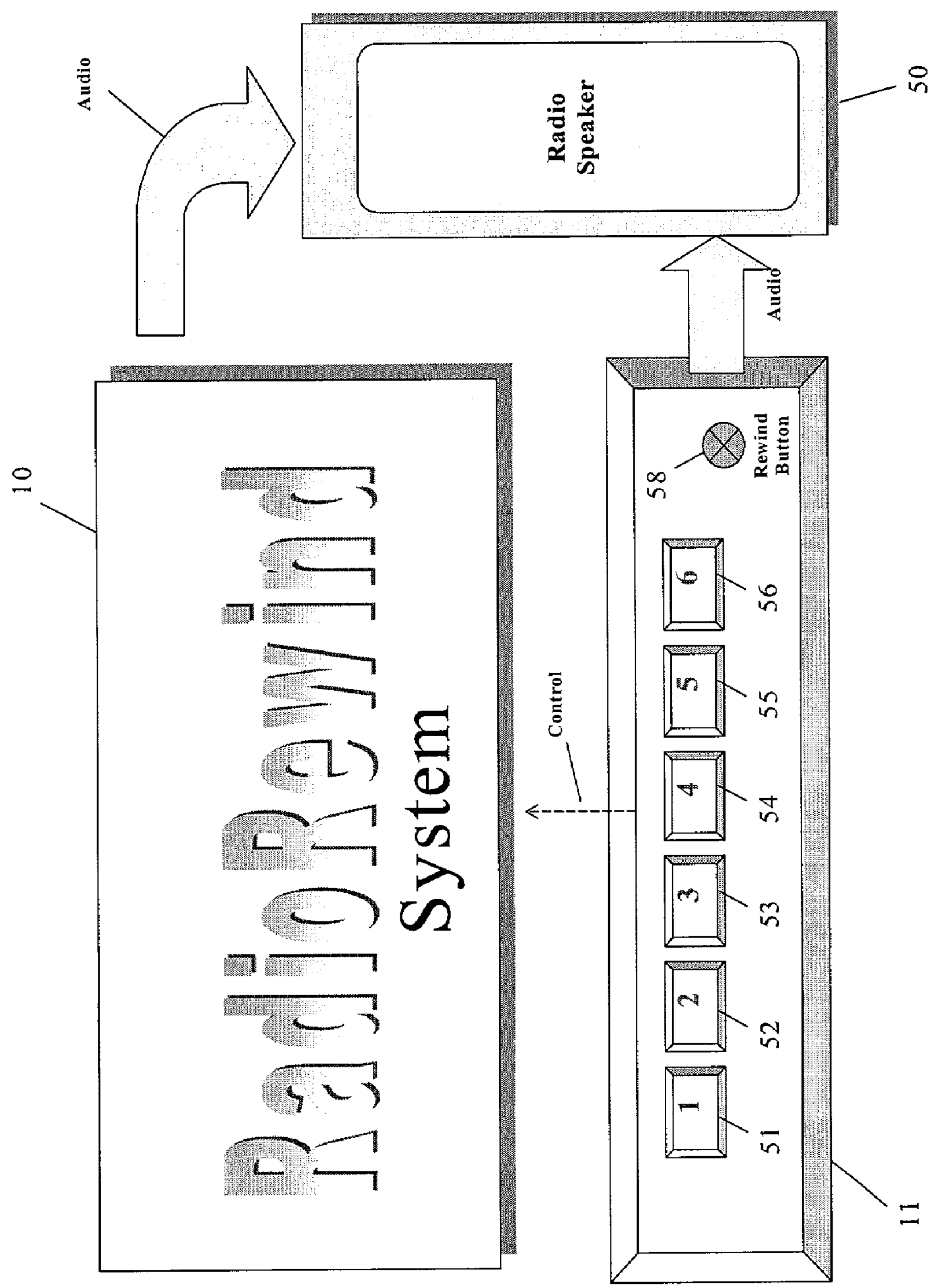
FIG. 1 is an overall block diagram of the present invention.

In one aspect thereof, the system of the present invention is a self-contained mechanism that can be readily adapted to most ordinary car radio-tape devices and takes on the general construction illustrated in FIG. 1.

With reference to FIG. 1, the self-contained mechanism is coupled to the instrument buttons 11 of the conventional car radio or tape deck, which includes channel selector buttons 51, 52, 53, 54, 55 and 56, as well as a rewind button 58. In a conventional radio, the audio output of the radio is directed to the radio speaker 50.

In accordance with the present invention, the channel selector buttons 51, 52, 53, 54, 55 and 56 cause the radio rewind system 10 to record segments of the incoming signal on several memories and these segments are then playable through the radio speaker 50, in response to the driver pressing the rewind button 58. When that button is momentarily actuated, a segment which has been prerecorded and which corresponds to the currently activated channel selector button 51–56 is played back through the radio speaker 50.

Figure 2:
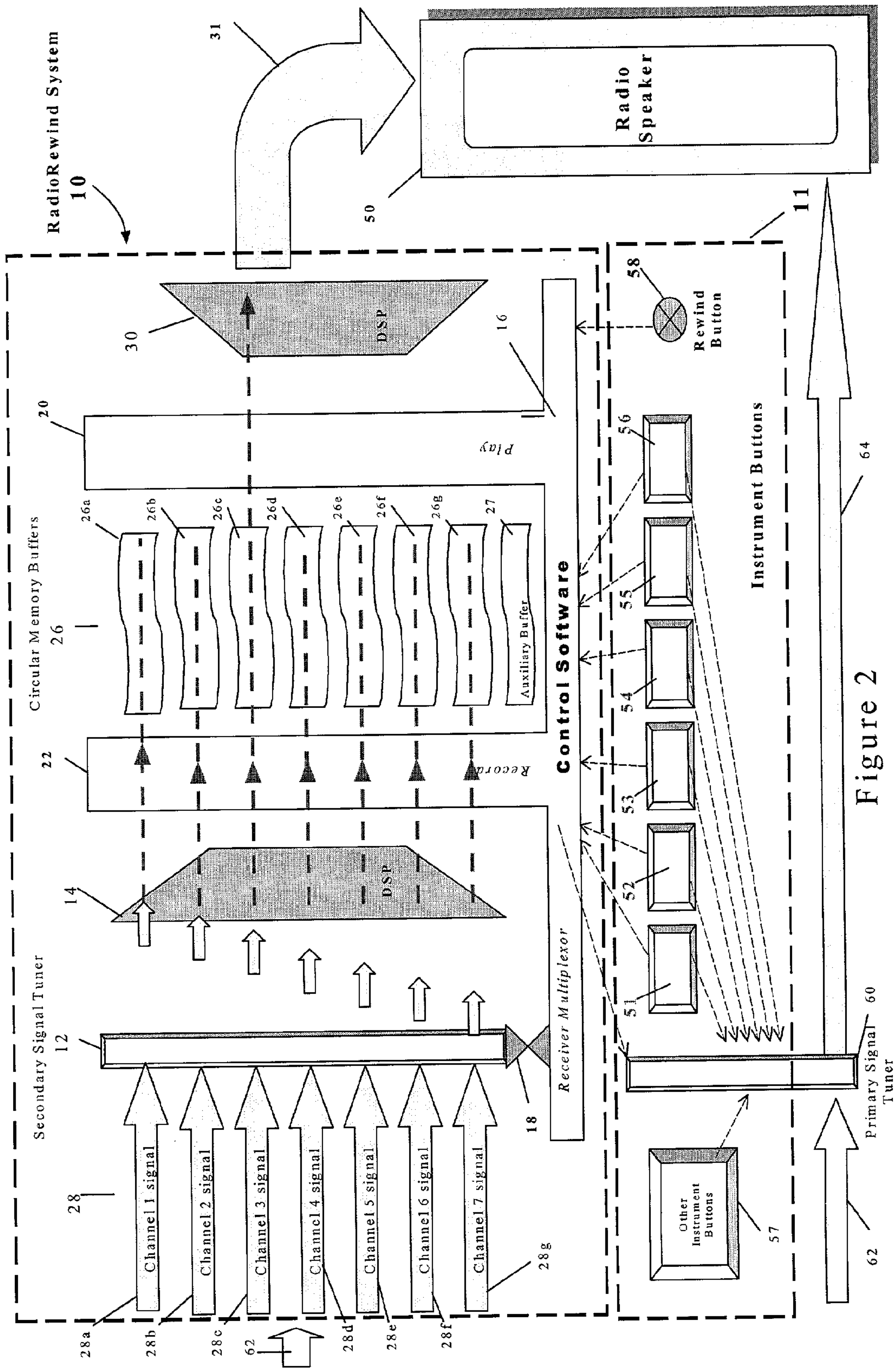
FIG. 2 is a more detailed block diagram of the present invention.

FIG. 2 depicts in greater detail various components of the radio rewind system 10 and the manner of its interaction with conventional radio components.

The radio rewind system 10 is operable by a central CPU or other control circuitry (not illustrated in this Figure) whose functionality is largely determined by control software 16, which interacts with the various components of the radio rewind system 10 as shown.

In the conventional section of the radio, the channel selector buttons 51–56 are electronically coupled (albeit, indirectly) to the primary signal tuner 60 that processes the conditioned RF signal 62 and selects from it the contents that pertain to a particular channel and provides that output to radio speaker 50.

In the radio rewind system 10, the same primary signal 62 contains, as is well known, many different channel signal portions 28, including specific channel signals diagrammatically identified as signals 28*a*, 28*b*, 28*c*, 28*d*, 28*e*, 28*f* and 28*g*. These are received in the secondary signal tuner 12 which, in response to a receiver multiplexer software 18 (associated with the control software 16), sequentially selects and time samples these channel signals, which it then provides to different channels of the digital signal processor 14 which processes the signals and subsequently provides them through a recorder software 22 to circular memory buffers 26, comprising portions 26*a*, 26*b*, 26*c*, 26*d*, 26*e*, 26*f* and 26*g*.

The control software 16 responds to the driver's pressing of the rewind button 58 by activating the play software 20 which is cognizant of which of the instrument channel selector buttons 51–56 is currently engaged and selects the corresponding contents from circular memory buffers 26*a*–26*g*, which it then supplies to the output-side, digital signal processor 30. That processor 30 converts the signal from its stored digital format to analog format, so that it may be supplied via the channel 31 to the radio speaker 50. When the rewind button is pressed, the control software stops the primary audio path, 64, to the speaker before it starts playing the recorded audio content.

An additional memory buffer, 26*g*, is used in the event that the currently engaged channel (e.g., Channel 7) is not one of the preprogrammed set of channels. When the receiver is switched to a channel that is not one of the preprogrammed set of channels, its content is recorded on the additional channel's memory buffer (e.g., buffer 26*g*) and is used for playback if the listener presses the rewind button while it is engaged as the current channel.

The instrument buttons 57 in FIG. 2 designate the other conventional radio-tape deck buttons, such as a "seek" or "tune" buttons that are found on a conventional radio control panel. These are also supplied to the primary signal tuner 60, so that the channel can be selected, other than via the programmable channel selector buttons 51–56.

The hardware and software arrangement shown in FIG. 2 functions so that the radio-rewind system 10 asynchronously receives six or seven (six if the currently engaged channel is in the preprogrammed set, and seven if the currently engaged channel is in not in the preprogrammed set) channels of audio signals by multiplexing on the secondary signal tuner, thereby recording the last few minutes of each of them as digital data that is stored in the separate circular memory buffers 26*a*–26*g*.

In this manner, when the listener selects a channel and hears the tail end of an interesting segment, the listener presses the rewind button 58, and the mechanism plays to the radio speaker 50 the recently received audio signals saved within one of the circular buffers 26.

Similarly, if the listener is distracted while listening to a segment and did not clearly hear a portion due to noise or some other distraction (not uncommon while driving a car), he or she can press the rewind button 58 and play back the segment.

The purpose of the auxiliary circular memory buffer memory 27 is for storing the audio contents of a particular channel that is currently being played from any one of the circular memory buffers 26*a*–26*g*. More specifically, assume that channel selector button 53 is engaged and the rewind button 58 has been pressed. In response, the system 10 will cause the contents of the circular memory buffer 26*c* to be played through the speaker 50. While this takes place, the information from the digital signal processor 14 will stream temporarily into the auxiliary circular memory buffer 27, so that no audio data is lost. Various pointers and indexes in the control software 16 assure that the overall system is aware where the contents of the last predetermined audio content for the channel being played have been stored.

It will also be understood that when a user reprograms any of the channel selector buttons 51–56, the control software 16 is immediately cognizant that a new audio channel has been selected for that particular button, to which it responds by controlling the receiver multiplexer software 18 to cause the secondary signal tuner 12 to start collecting multiplexed signals for the newly selected channel.

Thus, at all times, the control software 16 knows the full frequency mappings, as well as the identity of the channel currently selected by the user for listening. Unless and until a user engages or presses the rewind button 58, the functionality of the conventional radio is not otherwise altered. However, as described above, if the rewind button is depressed, then the radio content is selected from the radio rewind system 10 as heretofore described.

Figure 5:
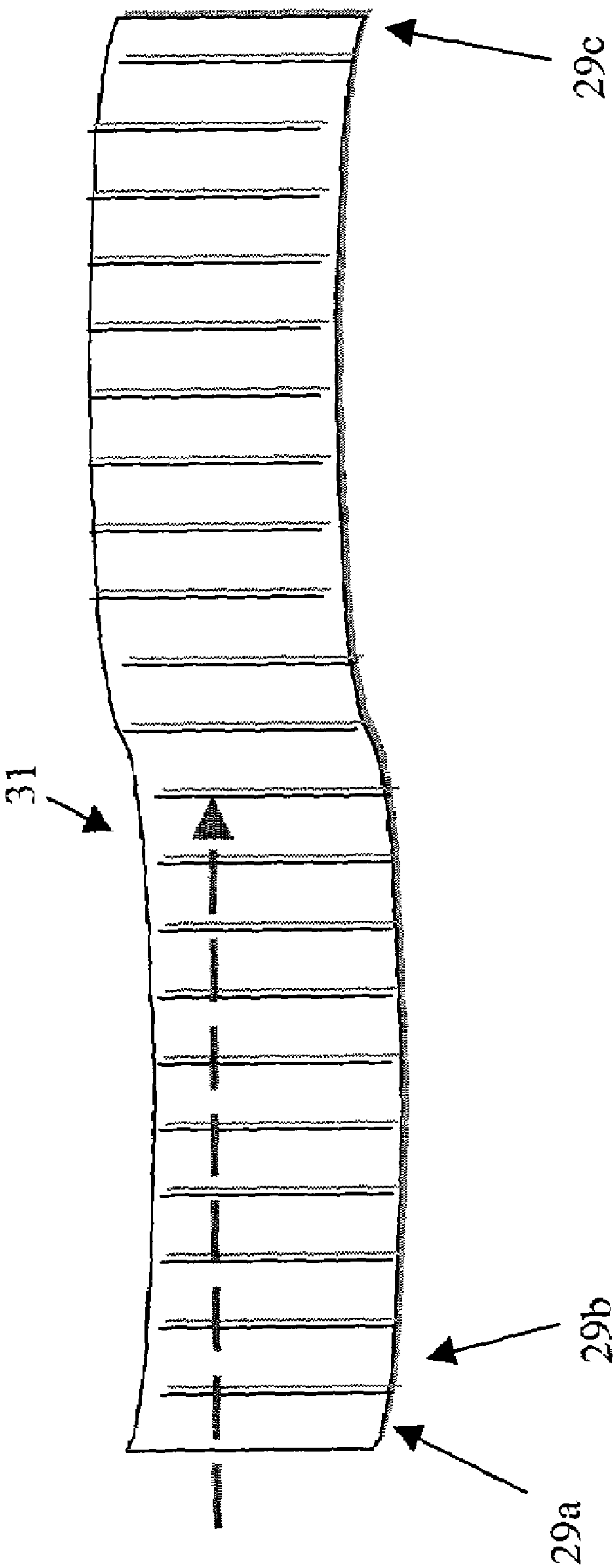
FIG. 5 is a diagram illustrating a concept of the present invention.

To further elucidate the invention, reference is made to FIG. 5, which shows a typical circular memory buffer 29 having a plurality of individual memory locations 29*a*, 29*b* . . . 29*n*. The size of the memory depends on the buffer size that is desired for the invention. For example, if that buffer size is to hold five minutes of audio content, and the sampling rate of the audio is 4,000 samples per second, the number of cells in the memory will be on the order of 1.2 million. Larger amounts of memory will be required for higher quality recording e.g., for music. This will be configurable by the user. If the memory is being filled from left to right, that is in the direction 29*a*, 29*b*, etc., then when the last audio memory content has been written into memory 29*c*, the next audio content will now wrap around and go into location 29*a*. Regardless, the control software 16 is always aware of the current location of the pointer 31 to the memory 29 and is able to determine where the most recent minutes of content is to be found (in the memory or in any portion thereof). The above description of circular memory 29 is a logical description which can be implemented in the form of (but not limited to) first-in first-out memory or another type of memory or simply a portion of a general read/write memory of the computer system.

Figure 3:
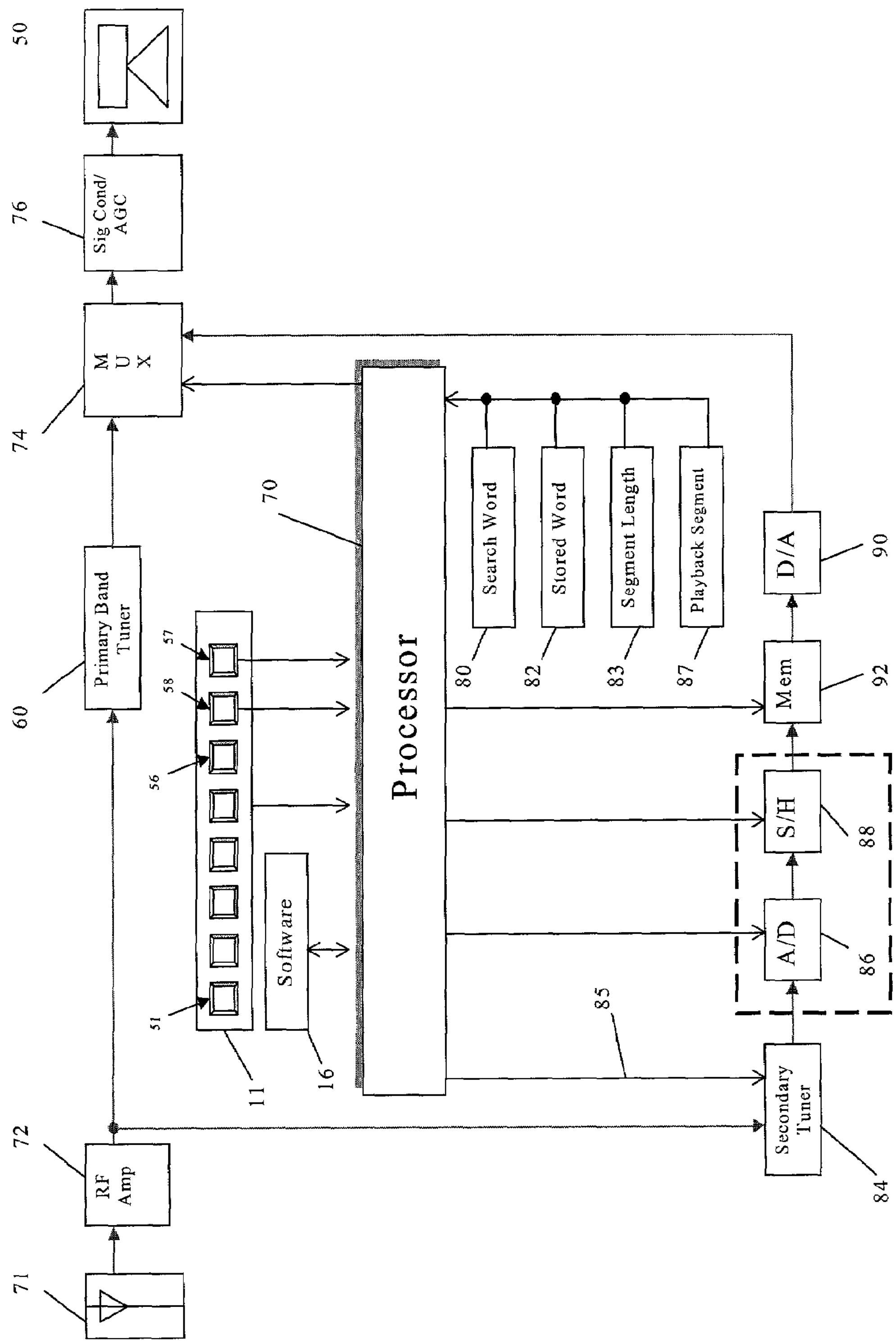
FIG. 3 is a block diagram of a further embodiment of the invention.

The present invention is further described by reference to FIG. 3, which depict an antenna 71 that receives the RF signal which it routes to the RF amplifier 72 that provides the conditioned signal for the primary band tuner 60. Normally, the multiplexer 74 receives the tuned signal from the tuner 60 and provides it to the signal conditioner 76 which comprises an audio amplifier and/or automatic gain control (AGC) circuitry, and which is responsive to the radio volume control, etc. so as to provide the output audio signal to the speaker 50.

The add-on, radio rewind system 10 of the present invention comprises a central processor 70 which operates with the aforementioned software 16 and which responds to inputs from the radio button cluster 11 that includes the channel selector buttons 51–56, the rewind button 58, etc. The button 58 may be mounted on the radio or coupled from the tape recorder section or tape playing section of the audio instrument. Other channel selecting and setting buttons collectively identified by reference numeral 57 are also coupled to the processor 70, as shown.

The RF amplified signal of the RF amplifier 72 is also provided to the secondary tuner 84. That tuner selects the signals to be tuned in rapid sequence, one after another, based on the channels that have been selected by the channel selector buttons 51–56, as commanded by the signal 85 from the processor 70. Each channel is selected for a very short time, sufficient to enable its analog to digital conversion and sampling by the circuits 86 and 88. The sampled digital signal is stored in a multichannel memory buffer 92 which is divided either physically or virtually into the circular memory buffers 26 as previously described.

Note that in a typical conventional radio the channel selector buttons 51–56 are programmed for more than one type of radio signal, for example, AM and FM signals. The invention is operable such that the buttons 51–56 specify tuning the signals of either the AM or FM bands, or a combination thereof. Alternatively, the invention is constructed so that the channels that are tuned by the tuner 84 and whose signals are stored in the multichannel buffer memory 92 are those that are selected by, for example, double clicking the buttons for denoting the AM or FM modes, so that a mix of AM and FM signals can be stored in the multichannel buffer memory 92.

Either way, in response to the pressing of the rewind button 58, the processor 70 effects the multichannel buffer memory 92 to output to the digital to analog convertor and signal processing circuit 90, the signals of the currently selected channel which are then supplied to the analog multiplexer 74. At this point, the processor 70 also commands the multiplexer 74 to route to the signal conditioner 76 the audio signals from the memory 92 rather than those from the conventional band tuner 60. These signals are conditioned at 76 and, thus, supplied to the speaker 50.

The combination of the software 16 with the processor 70 enables the system 10 to be adapted by proper programming of the software 16 to respond to various other inputs, for example, from a search word button 80 or from a stored word actuating button 82. The search word button 80 triggers software that causes the processor 70 to initiate a search through the digital information located in the multichannel memory buffer 92 for specific words in any of the channels, which when found, will cause the stored channel content to be played through the speaker 50. For example, if the listener hears the word "traffic" and immediately presses the search word button 80, the software recognizes the signature word "traffic" and may search through other channels and prompt the driver with voice synthesis circuitry, not shown, whether he or she wishes to hear a segment on "traffic", that it knows has been stored in other channels. Alternatively, if the stored word search button 82 has been pressed, then a prestored list of words such as "traffic", "weather", or "accidents" is played sequentially and when confirmed by a second pressing of the button 82, causes a search for corresponding contents to be initiated in the multichannel memory buffer 92. The button 83 may be used to alter the length of the segment that is stored in the multichannel memory buffer 92, for example, three minutes or five minutes or ten minutes, etc.

Alternatively, pressing the search word button 80 twice quickly, or holding it for more than a second, triggers software that causes the processor 70 to initiate an asynchronous process that continuously scans the incoming audio channel data arriving in the multichannel memory buffer 92 for digital signal representing the signature word (e.g., "traffic") in any of the programmed channels. When the word is detected in one of the channels, that channel automatically becomes the currently engaged channel of the radio allowing the listener to hear from that point onward. The scanning continues until the user presses the button 80 once more.

Similarly, pressing the search button 82 quickly, or holding it for more than a second, triggers software that causes the processor 70 to initiate an asynchronous process that continuously scans the incoming audio channel data arriving in the multichannel memory buffer 92 for one of a list of prestored list of words occurring on any of the programmed channels. When one of the words is detected in one of the channels, that channel automatically becomes the currently engaged channel of the radio allowing the listener to hear from that point onward, and the scanning stops. Otherwise, the scanning continues until the user presses button 82 once more. Search words can be entered by voice activated inputs or keyboard or the like.

The playback segment button 87 may be activated to cause the processor 70 to find a break in the current piece being played, so that "segments" of radio content can be played back. For example, the processor 70 is able to analyze the incoming data in the various channels and detect, for example, the beginning of a song. Therefore, if a listener is listening to a song and has gotten to the end of a song and wishes to hear the same song again, merely by pressing the "playback segment", button 87 she would hear the same song again, the beginning thereof being found regardless of the length of the song. As yet another feature, the pressing of a combination of the foregoing instrument buttons activates the processor 70 to set the, time measured period of the stored audio data.

Navigational controls normally found on a tape-recorder, such as a 'pause' button and a 'fast-forward' button will operate on the stored memory buffer. This will allow the listener to navigate within a memory buffer once one of the recorded channel buffers starts to play via the rewind button. These controls are incorporated as part of reference numeral 57.

Figure 4:
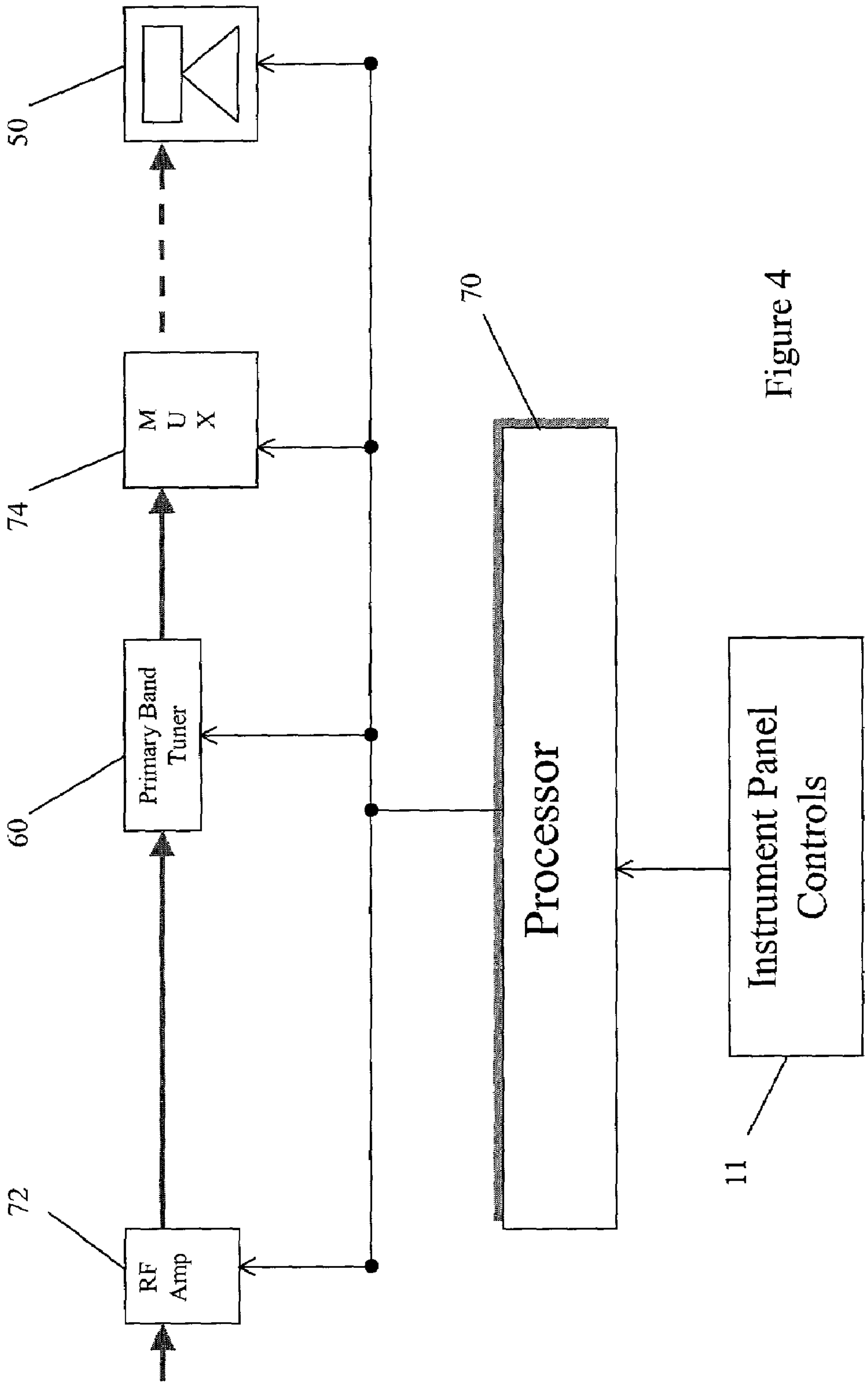
FIG. 4 illustrates a modification to the embodiment of FIG. 3.

While the invention has been described as an add-on to an existing, conventional radio, the entire radio can be designed with the aim of achieving the ends of the present invention. In such a radio, the processor 70 can be directly coupled to and control all of the conventional components of the radio as well, including the RF amplifier 72, the primary band tuner 60, the multiplexer 74 and the speaker 50, as well as other components thereof. The processor simply responds to the commands that come from the various buttons and controls that are associated with the instrument panel controls 11. See FIG. 4.

In accordance with another aspect of the invention, the Control Software 16, can react to a button to PAUSE the live radio broadcast being listened to on the currently engaged channel. Such a mechanism is used in a manner similar to how a PAUSE button is used while listening to ordinary recorded content—it stops the content from playing so as to give the listener a chance to momentarily focus his attention on something else and enables the listener to resume the listening from that point soon thereafter when the listener hits PLAY.

To facilitate this capability, in response to the listener pressing a PAUSE button (for example, by pressing the rewind button twice or by providing a separate PAUSE button provided on the radio or using the PAUSE button of an accompanying tape player), the Control Software would record the point within the currently engaged channel's memory buffer and then stops the play software 20 from passing the channel's content to the output-side digital signal processor 30 and radio speaker 50.

While in a PAUSED-ed state, the recorder software 22 records the channel's newly received content to the currently engaged channel's circular memory buffer 26. When the listener subsequently presses the PLAY button, the PAUSED state is ended and the content from the currently engaged channel that had been recorded is played from the point that it had been PAUSE-ed.

The present invention and the description herein are also applicable to video equipment which may be incorporated in vehicles in the like. Moreover, it is also applicable to stationary, home-based audio and video equipment as well.

The present invention includes incorporation in the processor 70 a facility that permits it to receive and act upon navigational controls. Navigational controls normally are provided on a tape-recorder, such as a "pause" button and a "fastforward" button. These controls are operated on a tape-recorder, whose buttons are coupled to the processor 70, enable the processor to operate on the stored memory buffer currently being played to allow the listener to navigate within a memory buffer one of the recorded channel buffers starts to play via the rewind or replay button.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A radio, comprising:

a receiver for receiving and conditioning a radio signal containing at least three programmed channel contents;

a primary tuner responsive to the receiver and tunable to select any of the programmed channel contents;

a signal conditioner circuit for receiving a selected signal from the primary tuner;

a speaker for playing the signal from the signal conditioner circuit;

a memory for simultaneously storing in digital form an immediately preceding, time measured quantity of the programmed channel content currently being played over the speaker; and a single replay button, so constructed that the actuation thereof alone is sufficient to immediately cause the programmed channel content that have been stored to be replayed to a listener over the speaker.

2. The radio of claim 1, in which the time measured quantity is setable between two and fifteen minutes.

3. The radio of claim 2, in which the time measured quantity is programmable via actuation buttons located on a radio panel.

4. The radio of claim 1, further comprising a digital to analog circuit and an analog to digital circuit for converting received analog signals to digital signals and for reconverting digital signals stored in the memory to analog signals playable over the speaker.

5. The radio of claim 1, wherein the single replay button comprises a rewind button that is associated with a tape player which produces audio that is also coupled to the speaker.

6. The radio of claim 1, further comprising a central processor and associated software for controlling the selection of the programmed channel contents that is played over the speaker.

7. The radio of claim 6, in which the software includes a facility for searching for at least one word which is embedded in the programmed channel contents that are stored in the memory.

8. The radio of claim 6, in which the software includes a facility for searching for program content segments.

9. The radio of claim 1, in which the memory is a circular memory.

10. A radio, comprising:

a receiver for receiving and conditioning a radio signal containing at least three programmed channel contents;

a primary tuner responsive to the RF receiver and tunable to select any of the programmed channel contents;

a signal conditioner circuit for receiving a selected signal from the primary tuner;

a speaker for playing the signal from the signal conditioner circuit;

a memory for simultaneously storing in digital form an immediately preceding time measured quantity of the programmed channel content currently being played over the speaker;

a secondary tuner;

a plurality of programmable channel select buttons;

a processor and a software program; and the memory comprising a plurality of memory sections and the secondary tuner being effective to tune a plurality of the programmed channel contents and to store each program channel content in a corresponding one of the plurality of memory sections, the channel programs being selected on a basis of the settings of the plurality of channel select buttons and each of the memory contents being selectable for being played over the speaker.

11. The radio of claim 10, in which the time measured quantity is setable between two and fifteen minutes.

12. The radio of claim 11, in which the time measured quantity is programmable via actuation buttons located on the radio panel.

13. The radio of claim 10, further comprising a digital to analog circuit and an analog to digital circuit for converting received analog signals to digital signals and for reconverting digital signals stored in the memory to analog signals playable over the speaker.

14. The radio of claim 10, including a replay button to actuate playing a selected memory content over the speaker.

15. The radio of claim 10, further comprising a central processor and associated software for controlling the selection of the programmed channel contents that is played over the speaker.

16. The radio of claim 15, in which the software includes a facility for searching for at least one word which is embedded in the programmed channel contents that are stored in the memory.

17. The radio of claim 15, in which the software includes a facility for searching for the beginning of program content segments.

18. A radio, comprising:

a receiver for receiving and conditioning a radio signal containing at least three programmed channel contents;

a primary tuner responsive to the receiver and tunable to select any of the programmed channel contents;

a signal conditioner circuit for receiving a selected signal from the primary tuner;

a speaker for playing the signal from the signal conditioner circuit;

a memory for simultaneously storing in digital form an immediately preceding, time measured quantity of the programmed channel content currently being played over the speaker; and a voice recognition circuit for recognizing an operator spoken command that instructs the radio to immediately cause the program channel content that have been stored to be replayed to a listener over the speaker.

19. The radio of claim 7, in which the software causes programmed channel contents where at least one word was found to become a currently engaged channel of the radio.

20. The radio of claim 14, wherein the replay button comprises a rewind button that is associated with a tape player which produces audio that is also coupled to the speaker.

21. The radio of claim 10, wherein the processor includes a facility that is capable of receiving navigational controls that permit pausing or fast-forwarding of program channel content.

22. The radio of claim 1, wherein the radio is an automobile radio.

* * * * *